Figure 1:
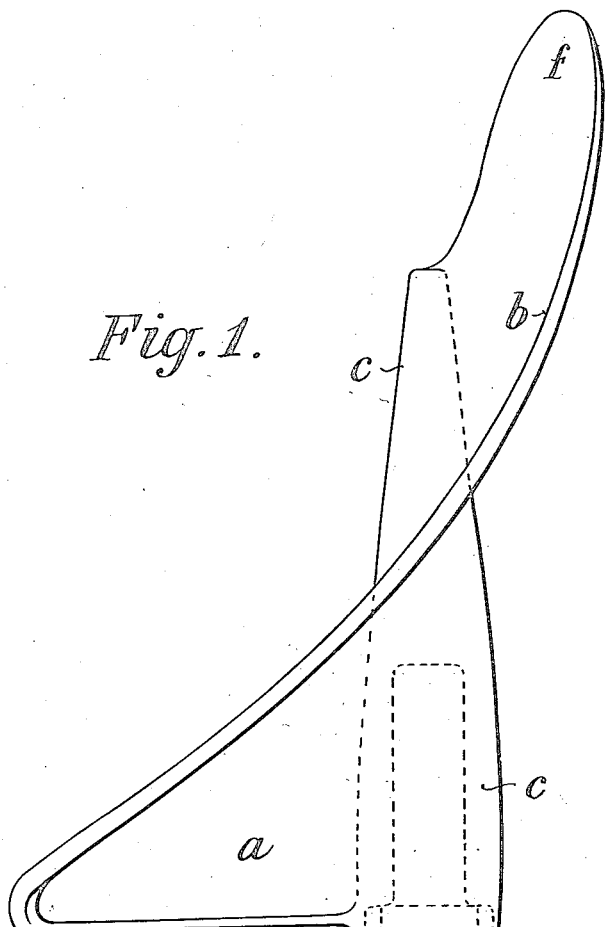

S. C. DAVIDSON.
TEA LEAF ROLLING AND MIXING MACHINE.
APPLICATION FILED FEB. 6, 1911.

1,069,861.

Patented Aug. 12, 1913.

5 SHEETS—SHEET 1.

WITNESSES:

INVENTOR:
Samuel Cleland Davidson,
By his Attorneys:

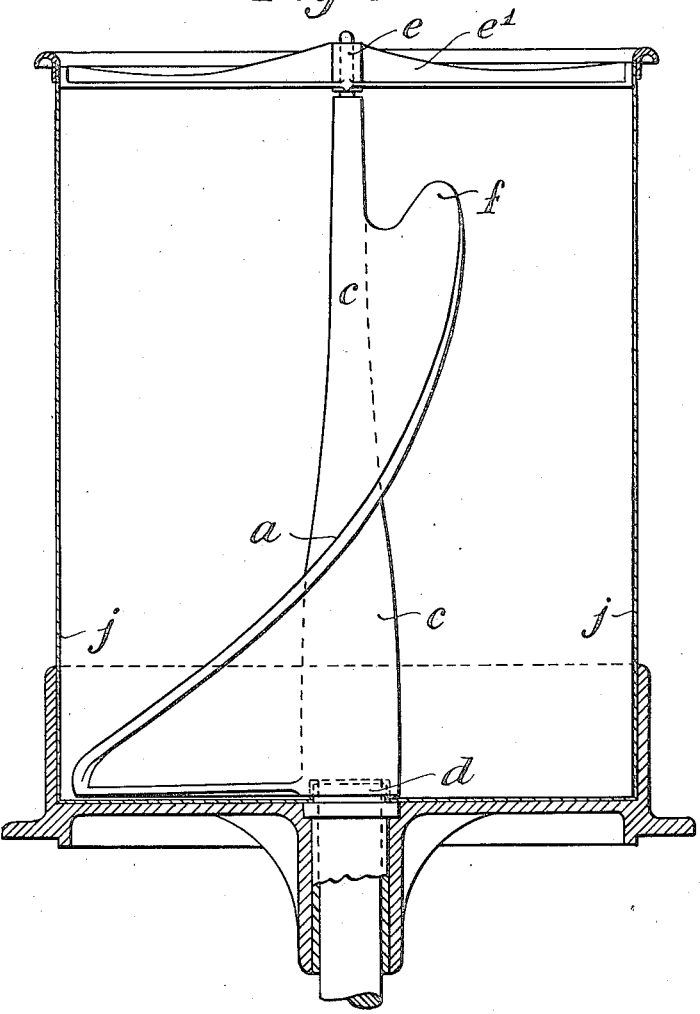

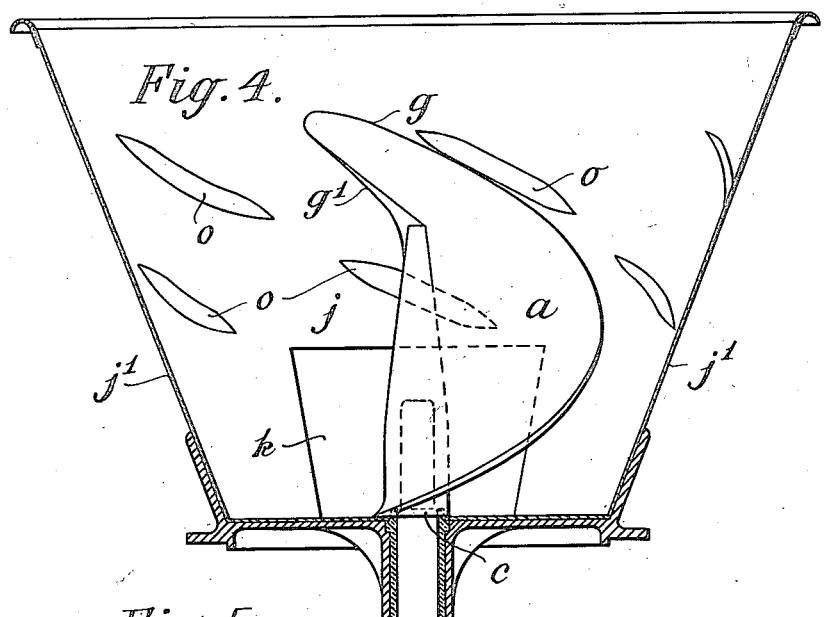
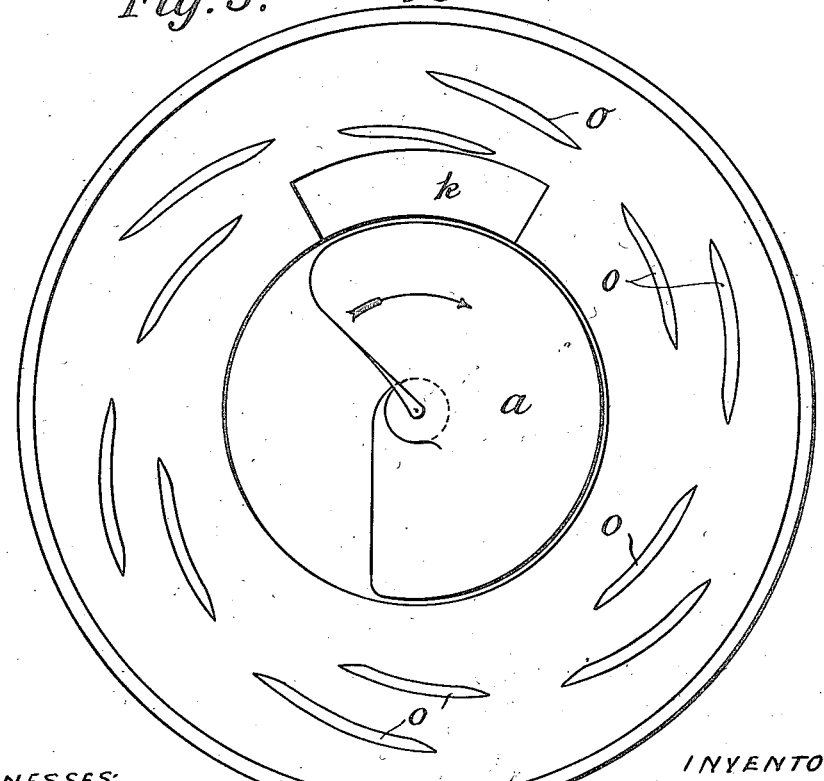

S. C. DAVIDSON.
TEA LEAF ROLLING AND MIXING MACHINE.
APPLICATION FILED FEB. 6, 1911.

1,069,861.

Patented Aug. 12, 1913.
5 SHEETS—SHEET 4.

WITNESSES:
Fred White
J. F. Wallace

INVENTOR:
Samuel Cleland Davidson,
By his Attorneys:
Fraser, Dunk & Myers

S. C. DAVIDSON.
TEA LEAF ROLLING AND MIXING MACHINE.
APPLICATION FILED FEB. 6, 1911.
1,069,861. Patented Aug. 12, 1913.
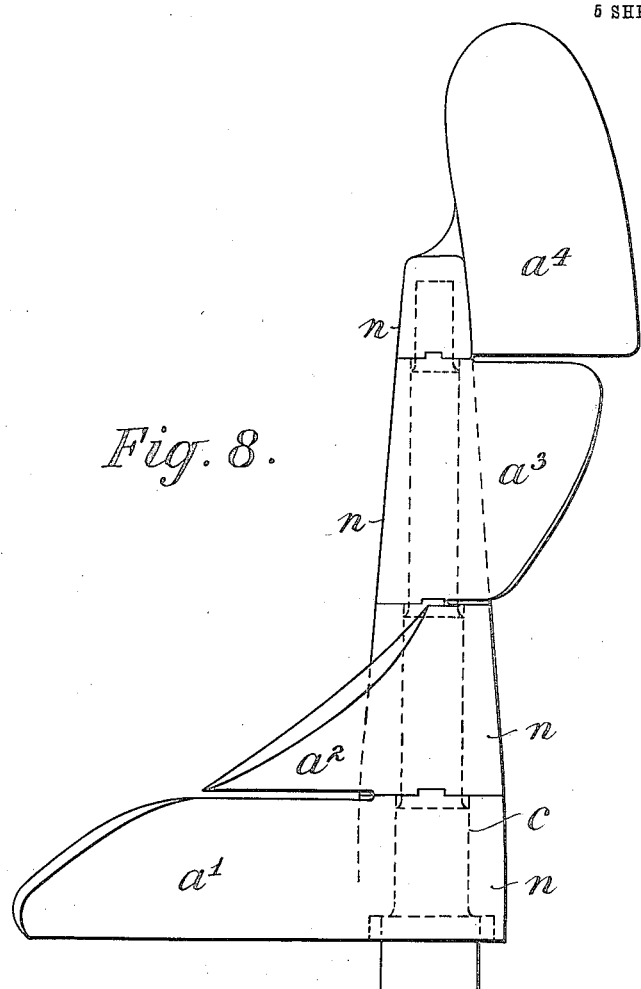
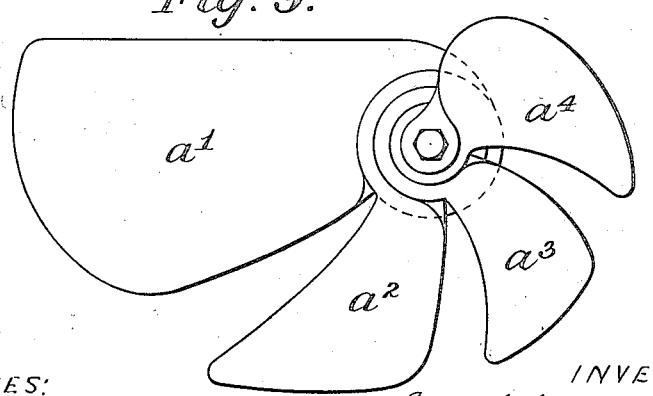

UNITED STATES PATENT OFFICE.

SAMUEL CLELAND DAVIDSON, OF BELFAST, IRELAND.

TEA-LEAF ROLLING AND MIXING MACHINE.

1,069,861.   Specification of Letters Patent.   Patented Aug. 12, 1913.

Application filed February 6, 1911. Serial No. 606,902.

*To all whom it may concern:*

Be it known that I, SAMUEL CLELAND DAVIDSON, of Sirocco Engineering Works, Belfast, Ireland, merchant, have invented certain new and useful Improvements in Tea-Leaf Rolling and Mixing Machines, of which the following is a specification.

This invention relates to tea leaf rolling and analogous machines of the kind wherein a container for the material to be dealt with is employed having within it a helical screw form of blade or device adapted for rotation about a central vertical axis as described in my prior Patent No. 980,213. In such apparatus certain devices are usually employed for retarding or partially checking any tendency of the tea-leaf in the container to rotate as a mass under the action of the beforementioned rotary device. Two or more of these rotary devices may, in some cases, be employed within one container of appropriate shape. The said machines and the hereinafter described improvements besides being useful as a tea leaf rolling machine for which same were originally designed may also be used for operating upon analogous materials.

It is the object of the present invention to provide an apparatus which will give a more positive and rapid circulation of the tea leaf up the center of the container and down the side, as part of or supplemental to a general lifting, falling and rolling effect produced by the action of the rotary helical or equivalent device or devices.

According to the present invention I employ an elongated blade or blades of greater length than width and of such pitch that the working surface of the blade or blades passes from the base to the top in one revolution or less, in combination with a container the walls of which are so shaped that a tapering annular space wider at the top than at the base is left between the walls of the container and the path described by the travel of the outer edge of the rotary helical blade or blades. For example a vertical or inclined and preferably cylindrical container has within it a rotary blade or device of greater height than width and of helical or equivalent acting shape, or combination of such devices, having the upper part or parts of less radius than the lower part or parts and tapering upward with a pitch so increasing that the operative surface changes from a slow pitch at the base to a quicker or more vertical pitch at the top end in about one revolution or less, whereby the blade or blades impart not only a general mixing, squeezing and twisting action upon the tea-leaf to be rolled, but also simultaneously therewith, or forming a part of such action, a positive upward motion of the leaf which forms the central core of the mass of material within the container, while the material around the circumference of the container has a falling or downward motion.

Figure 2:
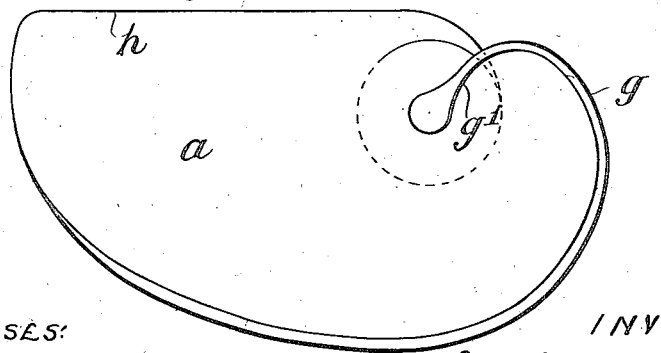
Figure 6:
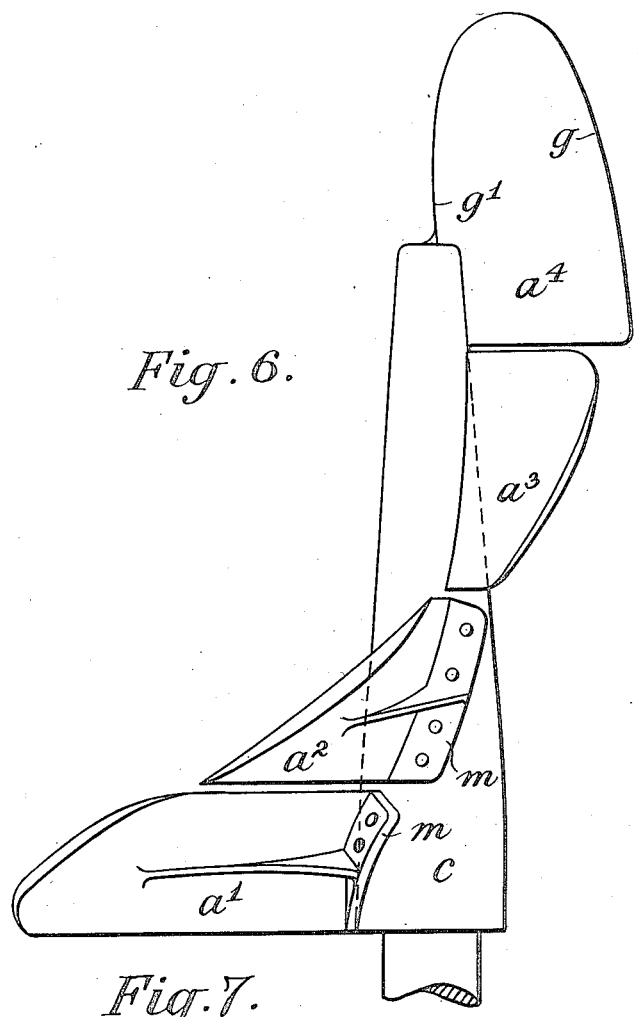
Figure 7:
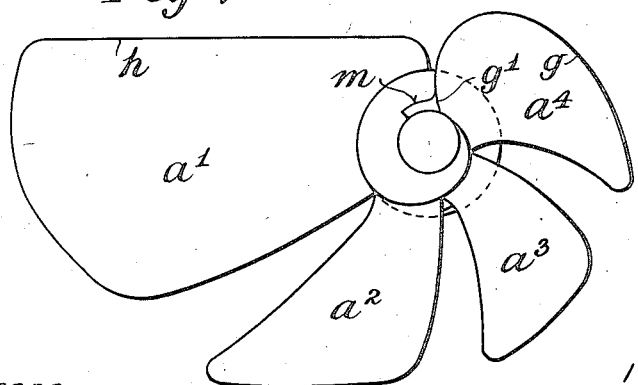

Referring to the drawings: Figure 1 is an elevation of one form of rotary blade made in accordance with my invention; Fig. 2 is a plan of Fig. 1; Fig. 3 is a sectional elevation of a container showing a modified form where the boss of the rotary blade is supported at both ends; Fig. 4 is a sectional elevation of a modified container and blade; Fig. 5 is a plan of same; Figs. 6 and 7 are similar views to Figs. 1 and 2 showing one method of constructing a composite blade having the general form of the blade shown in Figs. 1 and 2; and Figs. 8 and 9 are similar views to Figs. 1 and 2 showing another method of constructing a composite blade having the general form of blade shown in Fig. 1.

In the construction shown in Figs. 1 and 2, the improved rotary helical blade $a$ is shaped as a tapering helix wider at the base than at the top of more or less concave section on its front or leading surface $b$, the blade $a$ being carried up to a considerable height in the container and in some cases right up to the top thereof; the blade is preferably provided with an elongated hub or boss $c$ which may extend from the floor of the container upward to a greater or less portion of the blade. The hub $c$ may be merged into the blade $a$ for a suitable proportion of the length (as shown in Fig. 3), the hub $c$ may be extended beyond the blade so as to be supported at both ends, at the lower end by the bearing $d$ and at the upper end by the bearing $e$ and cross bar $e'$. The blade $a$ may terminate in a somewhat rounded or elliptical tip $f$ and which may be termed a "wing-like tip" lying to one side of the central axis on which the blade rotates. Such wing-like tip is of suitable curvature in cross section and its leading or outer edge $g$ is preferably so made that when rotating it has a lead in relation to its inner edge $g'$. The base $h$ of the blade $a$ or that part which is near to and travels over the floor of the container is preferably made of such a width as to come close to the side or wall of the container $j$ and thereby insure in each revolution thereof a lifting and falling action on the tea-leaf over the entire surface of the floor of the container and also an effectively complete discharge of the contained material through the door $k$ in the side when the same is opened (Figs. 4 and 5). The container $j$ is preferably circular in horizontal cross section, but it is to be understood that it may be of polygonal, square, oblong, trefoil, or other shape adapted for the use of one or more of the rotary devices described, and the walls of the container may be inclined inwardly or outwardly or they may be parallel.

In another modification shown in Figs. 4 and 5 I may employ a rotary helical device $a$ of the same radius, or substantially equal radius from top to bottom, and fit same in a container $j$ having the wall $j'$ thereof flared or outwardly inclined toward the top end. As shown in Figs. 6 and 7 and 8 and 9 I may also alternatively construct the said rotary helical device in the form of a succession of blade-like members $a'$ $a^2$ $a^3$ and $a^4$ of suitable length projecting from a central column or axis $c$ and with their operative surface at an inclination to the floor of the container, and so formed and arranged that the combination of said projections, one above the other, will operate substantially in the manner of a helical blade. As shown in Figs. 6 and 7 the several blade-like members $a'$, $a^2$, $a^3$ and $a^4$ may be made in one with or attached to flanges $m$ $m$ on a central column or axis $c$ or as shown in Figs. 8 and 9 a series of separate blade-like members $a'$, $a^2$, $a^3$ and $a^4$ may be provided with suitable hubs or bosses $n$ and assembled upon a central shaft $c$ (Figs. 8 and 9). The retarding devices $o$ on the inner surface of the container may be of the special form herein illustrated, or they may be of convex or triangular or of rectangular cross section with their ends and sides suitably beveled off and they may be arranged in one or more superimposed rows around the inner surface of the container $j$.

In addition to the above I may use other equivalently acting retarding devices or may take advantage of any bolts or rivets used to fasten the sides of the container to the socket surrounding its base to provide additional retarding devices by arranging for the rivet or bolt heads to project into the container above the path of the widest portion of the base of the helical rotary device. The present invention is also applicable to the double and multiple forms of machine before referred to and for example as shown in double and triple form in my before mentioned prior patent.

What I claim as my invention, and desire to secure by Letters Patent, is:—

1. A tea-leaf mixing and rolling machine, comprising a container and a rotary device therein adapted to rotate in a direction to lift material in the container, having a helical blade of greater height than width, progressively increasing in pitch, and extends from its base to its top in not more than one revolution.

2. A tea-leaf rolling machine comprising a rotary helical blade, said blade being of greater height than width and of such pitch that the working surface thereof extends from the base to the top in not more than one revolution, and a container between the walls of which and the path described by the travel of the outer edge of said rotary helical blade is left a tapering annular space wider at the top than at the base, said rotary blade being rotatable in a direction to lift material contained in said container.

3. A tea-leaf rolling machine comprising a rotary helical blade progressively increasing in pitch, said blade being of greater height than width and of such pitch that the working surface thereof extends from the base to the top in not more than one revolution, and a container between the walls of which and the path described by the travel of the outer edge of said rotary helical blade is left a tapering annular space wider at the top than at the base, said rotary blade being rotatable in a direction to lift material contained in said container.

4. A tea-leaf rolling machine comprising a rotary helical blade of greater height than width, wider at the base than at the top and tapering upward with a pitch increasing from a slow pitch at the base to a quicker or more vertical pitch at the top in not more than one revolution, and a container between the walls of which and the path described by the travel of the outer edge of the rotary helical blade is left a tapering annular space wider at the top than at the base, said rotary blade being rotatable in a direction to lift material contained in said container.

5. A tea-leaf rolling machine comprising a rotary helical blade of greater height than width and of such pitch that the working surface thereof passes from the base to the top in not more than one revolution, said blade terminating at its upper end in a wing-like tip lying to one side of the central axis on which the blade rotates, and a container between the walls of which and the path described by the travel of the outer edge of the rotary helical blade is left a tapering annular space wider at the top than at the base, said rotary blade being rotatable in a direction to lift material contained in said container.

6. A tea-leaf rolling machine comprising a rotary helical blade of greater height than width progressively increasing in pitch, and of such pitch that the working surface thereof passes from the base to the top in not more than one revolution, said blade having its outer edge curved or rounded over, and a container between the walls of which and the path described by the travel of the outer edge of the rotary helical blade is left a tapering annular space wider at the top than at the base, said rotary blade being rotatable in a direction to lift material contained in said container.

7. A tea-leaf rolling machine comprising a rotary helical blade of greater height than width and of such pitch that the working surface thereof passes from the base to the top in not more than one revolution, and a container the walls of which are so shaped that a tapering annular space wider at the top than at the base is left between the walls of the container and the path described by the travel of the outer edge of the rotary helical blade or blades, said container being provided with retarding devices comprising a number of rib or bar-like projections inclined to the base of the container and arranged in superimposed rows with suitable spaces between the high ends of the bars in one row and the lower ends of those in the same row, said rotary blade being rotatable in a direction to lift material contained in said container.

8. A tea-leaf mixing and rolling machine, comprising a container and rotary device therein adapted to rotate in a direction to lift material in the container, having a helical blade of greater height than width, progressively increasing in pitch, and extends from its base to its top in not more than one revolution, said blade being tapered toward its top, whereby an annular tapered space is left between the blade and the container.

In witness whereof, I have hereunto signed my name in the presence of two subscribing witnesses.

SAMUEL CLELAND DAVIDSON.

Witnesses:
GEORGE GOOLD WARD,
JOHN JOHNSON.